(12) United States Patent
Nathan

(10) Patent No.: US 6,898,161 B1
(45) Date of Patent: May 24, 2005

(54) SOUND CONTROL CIRCUIT FOR A DIGITAL AUDIOVISUAL REPRODUCTION SYSTEM

(75) Inventor: Guy Nathan, Yerres (FR)

(73) Assignee: Touchtunes Music Corporation, Las Vegas, NV (US)

( * ) Notice: Subject to any disclaimer, the term of this patent is extended or adjusted under 35 U.S.C. 154(b) by 0 days.

(21) Appl. No.: 09/357,758

(22) Filed: Jul. 21, 1999

(30) Foreign Application Priority Data

Jul. 22, 1998 (FR) .................................. 98 09350

(51) Int. Cl.⁷ .............................................. G11B 17/22
(52) U.S. Cl. .................. 369/36.06; 381/123; 381/104; 369/24.01
(58) Field of Search .............................. 381/104, 102, 381/107, 109, 123; 463/39, 35, 36; 369/30.01, 30.04, 30.06, 30.09, 24.01; 434/307 A, 307 R; 700/94

(56) References Cited

U.S. PATENT DOCUMENTS

| | | | |
|---|---|---|---|
| 4,375,287 A | * 3/1983 | Smith ........................... 463/22 |
| 4,588,187 A | * 5/1986 | Dell ............................. 463/47 |
| 4,593,904 A | 6/1986 | Graves |
| 4,825,054 A | 4/1989 | Rust et al. |
| 5,252,775 A | 10/1993 | Urano |
| 5,339,095 A | 8/1994 | Redford |
| 5,355,302 A | * 10/1994 | Martin et al. ................. 700/234 |
| 5,389,950 A | 2/1995 | Bouton |
| 5,499,921 A | 3/1996 | Sone |
| 5,546,039 A | 8/1996 | Hewitt et al. |
| 5,561,709 A | 10/1996 | Remillard |
| 5,659,466 A | 8/1997 | Norris et al. |
| 5,680,533 A | * 10/1997 | Yamato et al. ................ 463/31 |
| 5,691,964 A | * 11/1997 | Niederlein et al. ....... 369/30.06 |
| 5,697,844 A | 12/1997 | Von Kohorn |
| 5,781,889 A | * 7/1998 | Martin et al. .................... 705/1 |
| 5,864,811 A | * 1/1999 | Tran et al. .................... 704/258 |
| 5,903,266 A | * 5/1999 | Berstis et al. ................ 345/338 |
| 6,018,726 A | 1/2000 | Tsumura |
| 6,247,022 B1 | * 6/2001 | Yankowski .............. 707/104.1 |
| 6,280,327 B1 | * 8/2001 | Leifer et al. .................. 463/39 |
| 6,308,204 B1 | * 10/2001 | Nathan et al. .............. 709/221 |
| 6,336,219 B1 | * 1/2002 | Nathan ........................ 725/91 |
| 6,544,122 B2 | * 4/2003 | Araki et al. ................... 463/35 |
| 6,590,838 B1 | * 7/2003 | Gerlings et al. ......... 369/30.06 |

FOREIGN PATENT DOCUMENTS

| | | |
|---|---|---|
| DE | 196 10 739 | 9/1997 |
| EP | 0 256 921 | 2/1988 |
| WO | WO 94/15306 | 7/1994 |
| WO | WO 01/00290 | 1/2001 |

OTHER PUBLICATIONS

"Robotic Wafer Handling System for class 10 Environments" *IBM Technical Disclosure Bulletin*, vol. 32, No. 9A, Feb. 1990, pp. 141–143.

"High–Speed Opens and Shorts Substrate Tester", *IBM Technical Disclosure Bulletin*, vol. 33, No. 12, May 1991, pp. 251–259.

* cited by examiner

*Primary Examiner*—Xu Mei
(74) *Attorney, Agent, or Firm*—Nixon & Vanderhye P.C.

(57) ABSTRACT

Sound control circuit comprising a game port, installed on a digital audiovisual reproduction system managed by an operating system, characterized in that the game port in the sound control circuit is used to create an access to the configuration of the audiovisual reproduction system and/or additional management functions for the audiovisual reproduction system.

12 Claims, 3 Drawing Sheets

SOUND CONTROL CIRCUIT FOR A DIGITAL AUDIOVISUAL REPRODUCTION SYSTEM

FIELD OF THE INVENTION

This invention relates to a sound control circuit for a digital audiovisual reproduction system.

BACKGROUND OF THE INVENTION

Sound control circuits making use of a game port to connect a joystick are known in prior art.

Prior art also includes systems in which a sound phenomenon occurs in loudspeakers when the sound control circuit is activated, at the time that a central unit equipped with a sound control circuit connected to sound reproduction means is initialized. This sound phenomenon usually results in a "pop" that can be heard in the loudspeakers.

OBJECT AND SUMMARY OF THE INVENTION

Therefore, the purpose of this invention is to overcome the disadvantages of prior art by proposing a sound control circuit providing access to the configuration of an audiovisual reproduction system in order to create additional functions for a smart digital audiovisual reproduction system.

This purpose is achieved by the fact that the sound control circuit is installed on a digital audiovisual reproduction system wherein the game port in the sound control circuit is used to create an access to the configuration of the reproduction system and/or additional management functions for the audiovisual reproduction system.

According to another feature, a first pin on the game port is grounded through a first switch, to create a temperature alarm for the audiovisual reproduction system.

According to another feature, a second pin on the game port is grounded through a second switch to increase the volume.

According to another feature, a third pin on the game port is grounded through a third switch to reduce the volume.

According to another feature, a fourth pin on the game port is grounded through a fourth switch when a microphone is activated, in order to obtain a function to increase the microphone volume and reduce the volume of other audio sources.

According to another feature, the first, second, third and fourth pins on the game port are grounded through a fifth switch for a short period to obtain access to system configuration modification functions.

According to another feature, the first, second, third and fourth pins on the game port are grounded through a first switch for a long period to cancel the musical selection being played, and other selections that are in the queue.

Another purpose of the invention is to propose a sound control circuit that inhibits sound production in loudspeakers for the time necessary to initialize the audiovisual reproduction system in order to prevent any sound phenomena.

This purpose is achieved due to the fact that the operating system sends an order through the sound control circuit to open an electric circuit, in order to switch the audiovisual reproduction system amplifier off during the period in which the audiovisual reproduction system is initialized, and sends an order to close the same circuit after the initialization has finished, to switch the amplifier on.

Another purpose of the invention is to provide security of information specific to the audiovisual reproduction system, through the sound control circuit.

This purpose is achieved by the fact that one input to the sound control circuit is connected to an integrated circuit comprising a non-volatile memory that the operating system uses through the sound control circuit to read or store information in the integrated circuit memory.

According to another feature, the information stored in the integrated circuit memory is only accessible after the user has been authenticated by entering a code.

BRIEF DESCRIPTION OF THE DRAWINGS

Other features and advantages of this invention will become clearer after reading the following description with reference to the attached drawings, in which.

DESCRIPTION OF PREFERRED EMBODIMENTS

Figure 1:
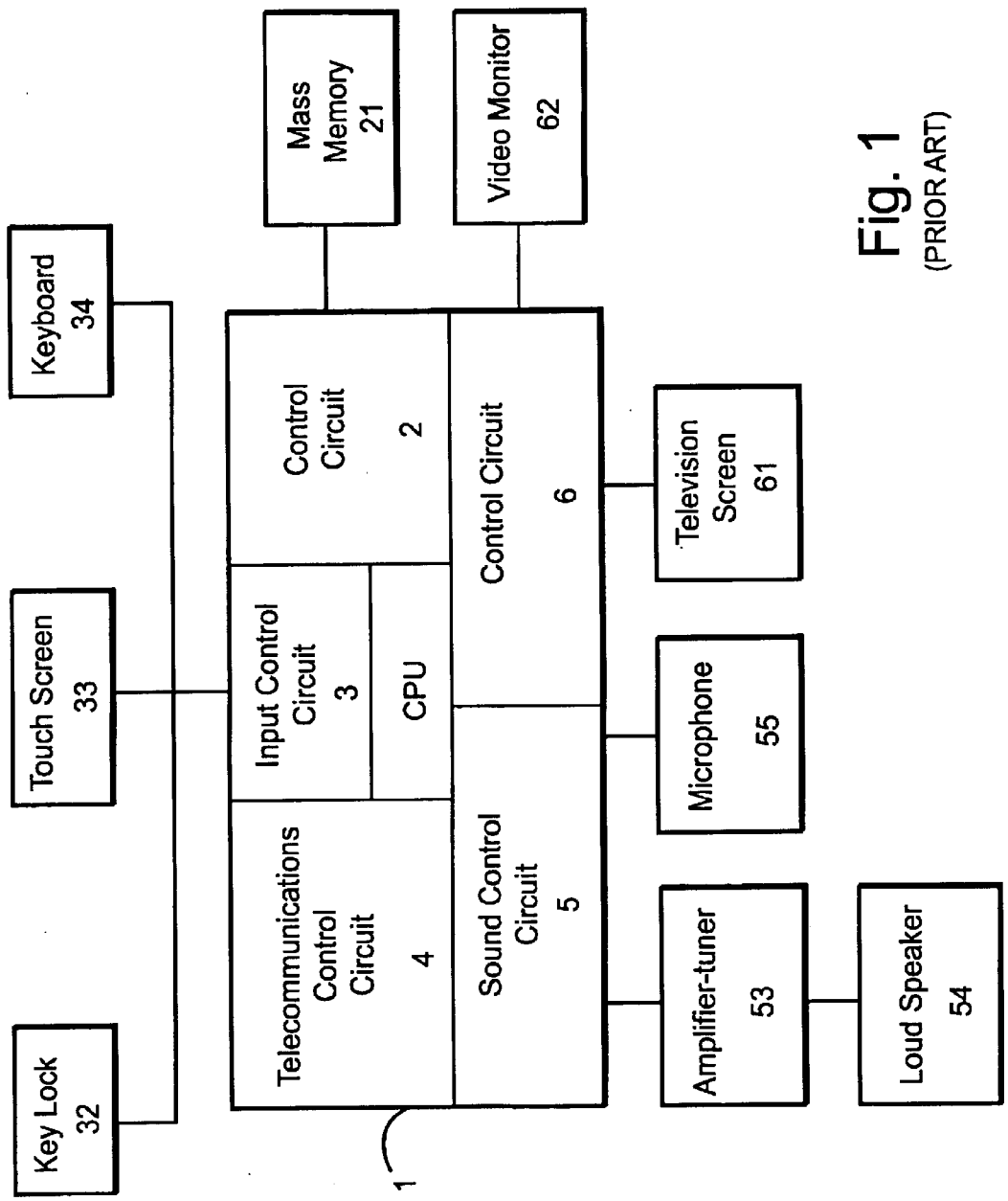
FIG. 1 shows an electrical diagram for a digital audiovisual reproduction system according to prior art.

FIG. 1 shows an electrical diagram of a digital audiovisual reproduction system according to prior art. This audiovisual reproduction system, also called a jukebox, was described in international patent application PCT/FR94/01185 deposited by the applicant. This system comprises particularly a central unit (1) that controls and manages a sound control circuit (5), a telecommunications control circuit (4), an input control circuit (3), a control circuit (2) for a mass memory (21), a control circuit (6) for a display means. The display means comprise mainly an SVGA type high resolution, low radiation, flat screen video monitor (62) without interlacing. This monitor is used for reproduction of images (for example album covers of musical selections), or graphics or video clips.

For reproduction of sound information for musical selections, the system comprises loudspeakers (54) that receive the signal from an amplifier-tuner (53) connected to the music synthesizer type of sound control circuit (5) designed to support a large number of input sources, while providing a CD (Compact Disk) type quality, for example such as a "Sound Blaster" multimedia audio adapter card for use with a microprocessor. The system may also include other audio sources for sound reproduction.

The audiovisual reproduction system manages a touch screen (33) through its input controller circuit (3), which includes a glass coating panel using the "advanced surface wave technology" and an AT type bus controller. Various items of information are displayed on the video monitor (62) or a television screen (61), and customers can use this touch screen to select one of these items of information, or the manager or the owner of the system can use it for management command and control information. The touch screen was also used for maintenance purposes in combination with an external keyboard (34) that could be connected to the system that was already fitted with a keyboard connector, controlled by a key lock (32) through the interface circuit. The system is housed in a steel frame.

Apart from these elements, a cordless microphone (55) is connected to the sound controller (5), which can transform this sound controller into a powerful public address and information system, or possibly a karaoke machine.

The system operating software is built up around a library of tools and services specifically oriented towards audiovisual applications in a multimedia universe. This library includes a high performance multitask operating system that efficiently enables simultaneous execution of multiple code fragments. This operating system thus enables concurrent execution of operations carried out on the display means, sound reproduction means and the management of telecommunications links through the distribution network, in an orderly manner while avoiding any conflicts. This operating system is also very flexible. This system prevents access to system configuration, for example to adjust the volume; in any way other than by using a keyboard and a keyboard connector controlled by a key lock.

Figure 2:
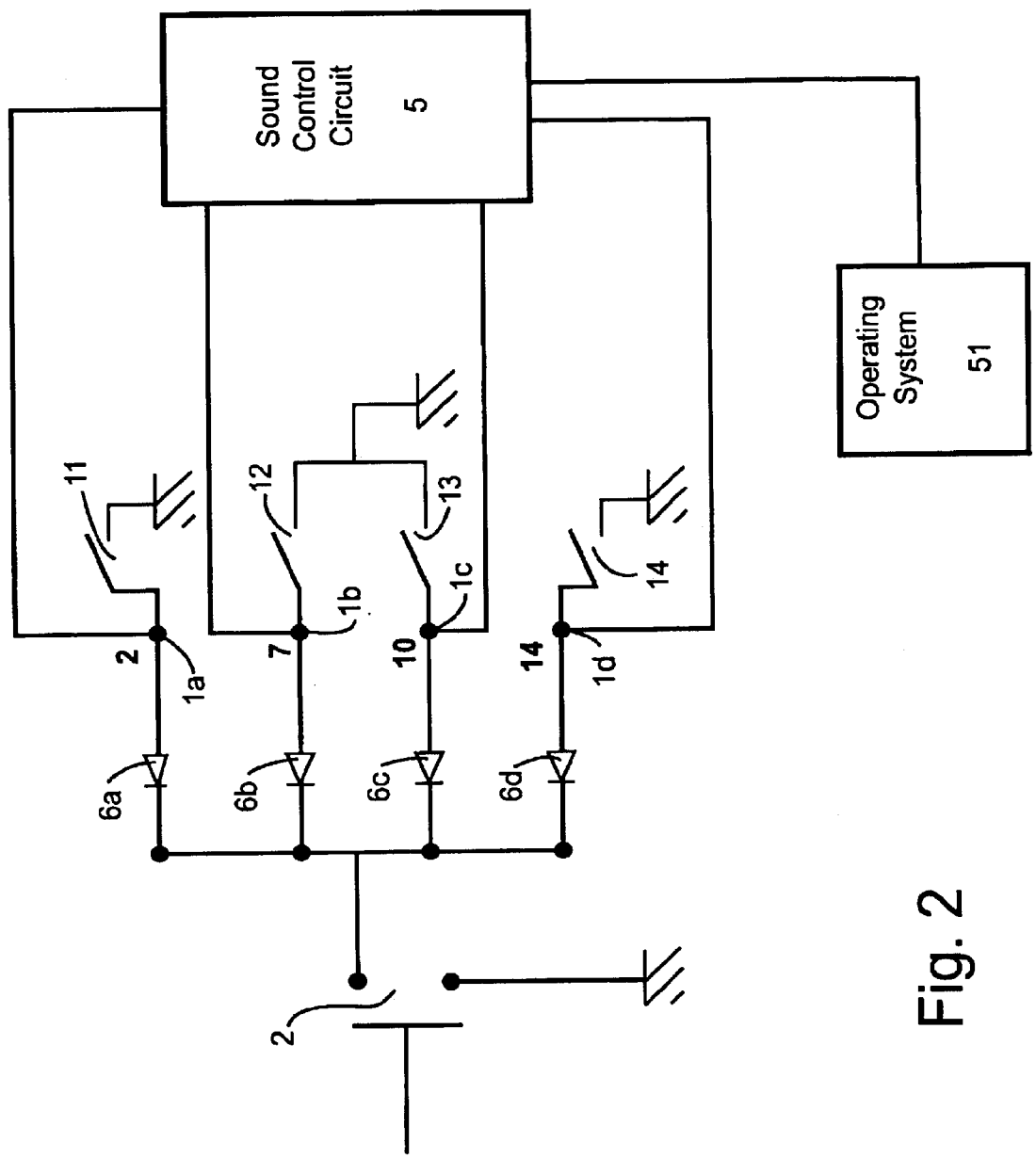
FIG. 2 shows an electrical diagram of a game port of the sound control circuit according to the invention.
Figure 3:
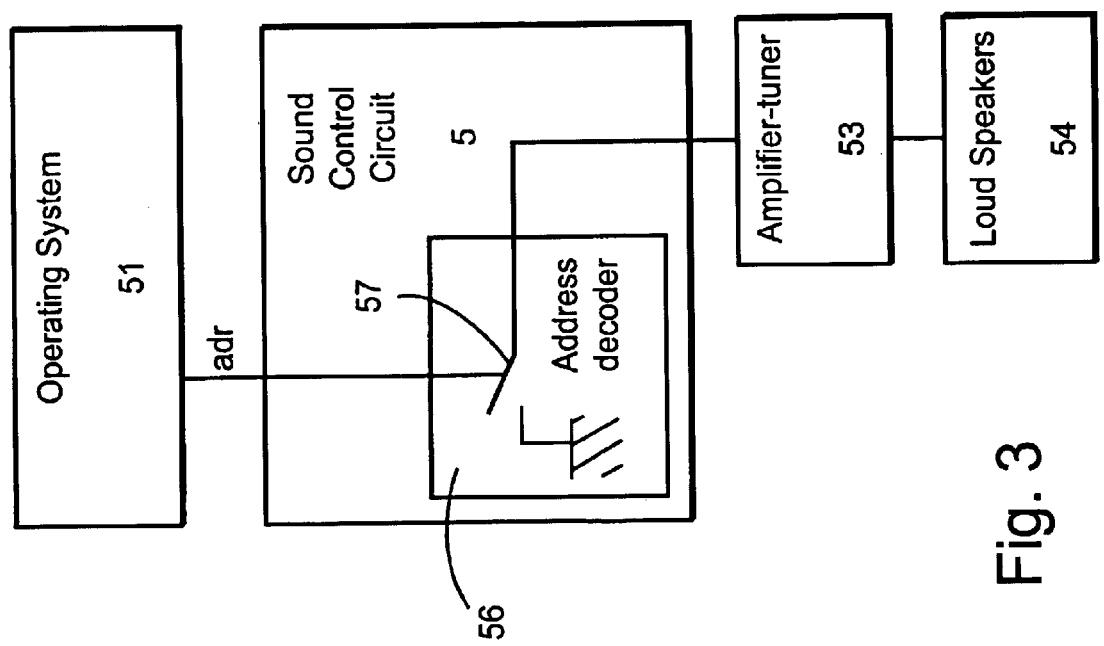
FIG. 3 shows a detail of the electrical diagram between the sound control circuit according to the invention and sound reproduction means.

FIG. 2 shows an electrical diagram of the game port of the sound control circuit according to the invention. Four pins (1a, 1b, 1c, 1d) on the game port of the sound control circuit (5) are each connected firstly to a terminal of a corresponding switch (11, 12, 13, 14), the other terminal of the switch being grounded to put the corresponding pin in the game port into contact with the ground when the corresponding switch (11, 12, 13, 14) is in the closed position, and secondly to the cathode of a corresponding diode (6a, 6b, 6c, 6d). The anodes of the corresponding diodes (6a, 6b, 6c, 6d) are connected to a common point connected to the same input to a fifth switch (2), in which the other input is grounded so that when this switch is in the closed position, it simultaneously grounds the four pins. Advantageously, pins (1a, 1b, 1c, 1d) on the game port used for the circuit according to the invention are pins No. 2, 7, 10 and 14. Thus, this circuit makes it possible to manage additional functions for an audiovisual reproduction system. A first switch (11) connected to pin No. 2 manages a system temperature alarm function. By controlling the first switch (11) through a temperature detection device, it is possible to close the first switch (11) when a determined temperature threshold is exceeded. For example, the first switch (11) closed information is interpreted by the sound control circuit (5) and by the operating system (51) of the audiovisual reproduction system to send an alarm request to the central server. A second switch (12) connected to pin No. 7 is used to increase the volume. This can be done for example by putting a control button on the frame of the audiovisual reproduction system such that pressing the button will close the contact of the second switch (12). The result of closing the second switch (12) is that the sound control circuit (5) sends a signal used by the operating system software (51) to increase the sound volume and to memorize this new reference value. A third switch (13) connected to pin No. 10 reduces the volume in exactly the same way. A fourth switch (14) is connected to pin No. 14 to manage use of the microphone (55, FIG. 1). The microphone (55, FIG. 1) preferably used with the audiovisual reproduction system is a microphone (55, FIG. 1) with a control switch. The user presses this switch when he wants to use the microphone (55, FIG. 1). Using the microphone (55, FIG. 1) reduces the sound volume of the musical selection currently being played, which may continue in the background, and increases the sound volume of the microphone (55, FIG. 1). Using the microphone (55, FIG. 1) also reduces the volume of the other audio sources. The fourth switch (14) also performs this operation automatically whenever the user presses the switch on the microphone (55, FIG. 1) to speak. In fact, all that is necessary is to connect the fourth switch (14) to the switch on the microphone (55, FIG. 1) such that when the user presses the microphone switch (55, FIG. 1), the fourth switch (14) closes and remains closed as long as the microphone switch (55, FIG. 1) is pressed. When the fourth switch (14) is closed, the sound control circuit (5) produces a signal used by the operating system software (51) to reduce the amplification of the signal output from the musical selection currently being played and to increase the signal from the microphone (55, FIG. 1). The fifth switch (2) is used to ground the four pins (1a, 1b, 1c, 1d) simultaneously to perform two different functions depending on the time during which a user keeps the fifth switch (2) closed. Advantageously, the fifth switch (2) is connected to a control button installed on the frame of the audiovisual reproduction system so that pressing the button closes the fifth switch (2). When the button is kept pressed for a short period, closing the fifth switch (2) triggers a counter. If the fifth switch (2) is closed before the countdown has finished, the sound control system (5) and the operating system (51) will trigger a management mode, in which in particular the configuration of the audiovisual reproduction system can be modified. For example, this management mode is described in French patent application 9401185. When the button is kept pressed for a longer period, the countdown can be completed and the fifth switch (2) is closed at the end of the countdown with the result that the sound control circuit (5) and the operating system (51) send a command to cancel the musical selection currently being played and selections waiting to be played. Musical selections waiting to be played are memorized in a file or queue created by the operating system. Triggering the cancel command will delete or initialize this file so that there are no musical selections waiting to be played. Advantageously, a special tool is necessary to access increase and reduce volume buttons and management mode, or the buttons may be located in a locked area inside the frame of the audiovisual reproduction system.

Another feature of the sound control circuit (5) according to the invention is that it prevents the occurrence of sound phenomena when the sound control circuit (5) is being activated during initialization of the operating system of the audiovisual reproduction system. Consequently, during the initialization phase of the audiovisual reproduction system, the operating system (51) sends an order on the address bus of the sound control circuit (5) to a given address to cutoff the power supply to the amplifier in the sound control circuit (5), through a switch (57). Switching off the amplifier by closing an electronic switch (57) controlled by an address decoder circuit (56) prevents sound production in the loudspeakers. At the end of the initialization phase, the operating system (51) sends another data address signal through the sound control circuit (5), which is decoded by the circuit (56) triggering opening of the electronic switch (57) to put the amplifier into normal service without creating any sound phenomena in the loudspeakers since the sound control circuit (5) has already been activated.

Another feature of the sound control circuit (5) according to the invention is that one of its inputs is connected to an integrated circuit. A sound control circuit (5) with two inputs is known in prior art. The integrated circuit is also known in prior art. Electrically power is only applied to this circuit when an operation is carried out, and it is capable of storing serial information in a non-volatile memory. Thus, the operating system can read or write information on the circuit, through the sound control circuit according to the invention. Advantageously, the integrated circuit is fixed to the frame of the audiovisual reproduction system and contains information particularly about the serial number of the audiovisual system and basic information about the configuration of the audiovisual reproduction system such as the sound volume, the number of credits, the version of the operating system, etc. Advantageously, information stored in the memory of the integrated circuit is only accessible after the user has been authenticated by inputting a code.

It is obvious that other modifications that can be made by an expert in the subject are within the framework of the invention.

What is claimed is:

1. An electronic jukebox managed by an operating system, said electronic jukebox comprising:

a sound control circuit for controlling audio output of said electronic jukebox, said sound control circuit comprising a game port; and said game port including plural pin connectors in communication with plural electrical switches of said electronic jukebox, said game port providing access to a configuration control function and management mode of said electronic jukebox to enable a user to change at least one of a configuration and management functions of said electronic jukebox when said game port is placed in communication with an user interface device.

2. An electronic jukebox according to claim 1, wherein a first pin of the game port is grounded through a first switch of the electronic jukebox to provide a temperature alarm function for the electronic jukebox.

3. An electronic jukebox according to claim 2, wherein a second pin of the game port is grounded through a second switch of the electronic jukebox to increase volume.

4. An electronic jukebox according to claim 3, wherein a third pin of the game port is grounded through a third switch of the electronic jukebox to reduce the volume.

5. An electronic jukebox according to claim 4, wherein a fourth pin of the game port is grounded through a fourth switch of the electronic jukebox when a microphone is activated, to increase the microphone volume and reduce the volume of other audio sources that are managed by the electronic jukebox.

6. An electronic jukebox according to claim 1, wherein a first, second, third and fourth pins of the game port are grounded through a fifth switch of the electronic jukebox for a short period to obtain access to system configuration modification functions.

7. An electronic jukebox according to claim 1, wherein a first, second, third and fourth pins of the game port are grounded through a fifth switch of the electronic jukebox for a long period to cancel a musical selection being played on the electronic jukebox, and other musical selections that are in a queue of songs to be played residing in a memory of the electronic jukebox.

8. An electronic jukebox according to claim 1, wherein the operating system sends an order through the sound control circuit to open an electrical circuit to switch an amplifier of the electronic jukebox off during a period in which the electronic jukebox is initialized, and sends an order to close said electrical circuit after initialization is completed, to switch the amplifier on.

9. An electronic jukebox according to claim 1, wherein said interface device comprises a touchscreen display.

10. An electronic jukebox according to claim 1, wherein said interface device comprises a joystick.

11. An electronic jukebox managed by an operating system, said electronic jukebox comprising:

a sound control circuit for controlling audio output of said electronic jukebox, said sound control circuit comprising a game port; and said game port in communication with plural electrical switches of said electronic jukebox, said game port providing access to a configuration control function and management mode of said electronic jukebox to enable a user to change at least one of a configuration and management functions of said electronic jukebox when said game port is placed in communication with an user interface device.

12. An electronic jukebox according to claim 1, wherein said interface device is in wireless communication with said game port.

* * * * *